United States Patent Office 2,892,720
Patented June 30, 1959

2,892,720

METHOD OF PROCESSING EGG ALBUMEN

John F. Murphy, Park Forest, and Eugene H. Uhing, Chicago, Ill., assignors to Swift & Company, Chicago, Ill., a corporation of Illinois No Drawing. Application January 30, 1957
Serial No. 637,063

7 Claims. (Cl. 99—113)

This invention relates to a process for reducing the yolk-lipid content of egg albumen and more specifically to the preparation of an egg albumen composition by a process which employs lipase to lower appreciably the yolk-lipid content of the albumen.

Minor amounts of yolk-lipid contaminant in egg whites interfere with the whipping properties and performance qualities of the whites. A small amount of egg yolk left in egg whites used in the preparation of angel food cakes, other cakes, and products depending on the foam structure of albumen will cut down appreciably the volume and quality of the finished product. Contamination will generally occur in one of two ways, either mechanical contamination during separation or contamination occurring during the storage of shell eggs prior to separation. Eggs held in storage, especially at the higher temperatures, will exhibit a diffusion of the egg yolk into the egg white. This latter contamination is beyond the control of the processor and heretofore he has been bound to accept it.

Yolk-lipid contamination in dried egg albumen is even more objectionable than in the liquid whites since the deleterious results are more exaggerated in the dried product. It is known that amounts of egg yolks in whites as small as 0.03% to 0.05% are objectionable.

It is an object of this invention to provide a method for the preparation of egg whites having superior qualities and characteristics.

A further object of the invention is the provision of a process for substantially reducing the lipid content of egg albumen whereby the quality of the final product is thereby improved.

A still further object of this invention is to provide an improved method for the preparation of a superior dehydrated egg albumen which is consistently of high quality for incorporation into prepared cake mixes and the like.

Further and additional objects will appear from the following description and the appended claims.

An advantage of our process is that it makes possible the manufacture of an acceptable dry egg elbumen from liquid egg whites which would normally be rejected for this purpose because of their high yolk-lipid content. The process is simple in its application and may be readily incorporated into various commercial processes now used in the preparation of dried egg whites.

It is general practice in the processing of egg whites to remove the sugar. One of the more common methods employed for desugaring is bacterial fermentation. This latter method may be readily modified to permit the utilization of the enzyme process of this invention. Following desugaring, egg whites may be dried. Two other conventional methods used for desugaring are processes employing yeast fermentation and enzyme treatment with deoxygenase. The method of this invention may also be easily incorporated in these two latter desugaring methods. One of the advantages of the present invention is that it may be employed to speed the bacterial desugaring process. Lipase can be used in the process for the purpose of reducing the lipid content of the eggs concurrently with the bacterial fermentation which desugars the eggs, and the same extent of desugaring will occur in a shorter period of time than can be obtained under the same conditions in the absence of lipase.

In one type of commercial operation the egg whites are passed through a strainer into large vats capable of holding approximately 8000 lbs. These vats are supplied with suitable coils for regulating the temperature of the material in the vat. Liquid egg whites in the vat are heated to a temperature of approximately 37° C. When the mass of egg white in the vat has attained the foregoing temperature, the whites are inoculated with a suitable bacterial culture and held for 4 to 24 hours at this temperature until sugar-free. The fermentating bacteria may be of several species, including Streptococcus and Aerobacter types. Our process may be practiced simultaneously with fermentative desugaring and is accomplished by introducing a small amount of a lipase preparation at the same time the bacterial inoculant is added to the egg whites.

The lipase preparation employed to catalyze the hydrolysis of yolk-lipids in the process of this invention may be obtained from various sources. Our preferred preparation (lipase) is derived from the pancreas of hogs. However, various sources are available for the extraction of lipase, including cottonseed, castor bean, soybean, and other plant materials. Lipase preparations derived from fungi or bacteria may also be utilized. Another animal source of lipase is the pancreas of cattle.

The usually preferred temperature for lipid hydrolysis catalyzed by lipase derived from hogs is about 50° C. However, the temperature of 37° C. at which egg whites are commonly desugared in bacterial fermentation is also acceptable. To increase the rate of reaction of our invention, temperature up to 50° C. may be employed. Excessive temperatures above 50° C. will in time inactivate the enzyme and are to be avoided. Temperatures below room temperature will decrease the reaction rate and for this reason we prefer to avoid temperatures below 20° C. The optimum temperature for activation of various lipase preparations will vary somewhat with the source of the material, but the range will not be greatly different from the foregoing.

The optimum pH for the reaction catalyzed by lipase is in the range of 5-8. Normally, after separation, the whites of eggs that have been in the shell for a period of time will have a pH in the vicinity of 9. If these eggs are to be bacterially fermented to remove the sugar, the pH will adjust to the range of 5-8 as the bacterial fermentation proceeds. Therefore, in such a process it is not necessary to make a special adjustment of the pH when using lipase therein. In the practice of deoxygenase and yeast desugaring processes, adequate amounts of suitable acids are added to the egg whites to drop the pH to around 7. This again will provide the proper pH for the practice of the present invention. In other instances where there is not some similar adjustment of the pH during the process, it is preferable that the pH be adjusted to within the range of 5-8 for the practice of the present invention.

The amount of lipase preparation that may be used in our process will vary greatly since the concentration of lipase merely affects the speed of the hydrolysis. That is to say, with an increase of the lipase the time required will be accordingly decreased up to a certain level of the lipase preparation beyond which no increase in the speed of reaction will occur. Since the lipase is introduced to the egg white early in the desugaring process, it is possible to use very low levels of the material as desugaring may take from 4 to 24 hours for completion. Another factor affecting the amount of enzyme is the specific activity of the enzyme preparation. The activity of the lipase derived from the same source, say hogs, will vary in its activity and as is obvious there is a wide variation in activity depending on the source of the lipase material or its preparation. The temperature at which the process is practiced also has a bearing on the amount of lipase required. It has been our experience that the amount of lipase preparation needed in our process is generally in excess of 0.001% based on the weight of the egg whites treated. Normally it is not necessary nor desirable to use amounts of lipase much in excess of 0.05%. Too large quantities of lipase may have a deleterious effect on the whipping characteristics of the egg whites treated defeating the purpose of this process. Our preferred range of concentration is 0.001% to 0.05% on a weight basis.

In the preceding description we have spoken of the use of our process in conjunction with desugaring in preparation for the drying of the egg albumen. It should be understood that our process may be employed to lower the lipid concentration of egg whites which are immediately used or which are preserved for later use by freezing.

The following examples are illustrative of our process and are not intended to be limiting as to conditions and materials employed. All yolk analysis in the following examples are based upon the measured percent lipid content found in the egg albumen. Using the measured figures for percent lipid content, the percentage of yolk necessary to produce that lipid content has been computed. The basis for computation was that each 100 parts of yolk contain 30 parts of lipid, so the percentage figures for lipid content were divided by 0.3 to obtain the yolk content percentage figure.

EXAMPLE I

In this example and in each of the succeeding examples our process is utilized in conjunction with the bacterial fermentation of egg whites heretofore described. The control egg white had a yolk content of 0.01%. The four lots were from the same batch of egg whites as the control and each had added to it 0.03% yolk. The first (sample 1) of the lots had no lipase added to it during bacterial fermentation. Each of the other three lots, samples 2, 3, and 4, were treated with levels of 0.005%, 0.01% and 0.05% lipase, respectively, during bacterial fermentation. The bacterium used for fermentation in this example was a species of streptococcus type organism commonly employed for such purposes. The lipase was added to the egg whites at the outset of bacterial fermentation. The control and four test lots were each analyzed for percentage of egg yolk upon completion of bacterial fermentation and prior to drying. The control was found to have 0.01% egg yolk and the untreated lot to which yolk was added (but no lipase) contained egg yolk at the level of 0.04%. Samples 2, 3, and 4 had yolk concentrations of 0.035%, 0.015%, and 0.010%. The control and the four test lots were separately dried by the commercial process known as fluff drying. After drying the egg yolk concentration of sample 2 was 0.015%. A cake was made using each of the egg whites and the height of the cake measured. The control had a cake height of 132 mm. and the untreated egg whites to which yolks had been added (sample 1) had a cake height of 120 mm. The three lipase treated experimental lots demonstrated marked improvement in cake height over the untreated lot. Samples 2, 3, and 4 had cake heights respectively of 128 mm., 127 mm., and 128 mm. The egg whites of the control had been handled with great care to avoid any mechanical contamination and what yolk-lipids were present were likely due to diffusion during the storage of the shell eggs. The foregoing data indicates that the lipase may have been active in the hydrolysis of the lipids during the early part of the drying process, since it will be noted that the percentage of yolk of sample 2 was considerably lower after drying than immediately prior to drying.

With respect to cake height, it is desirable that the cake height be as great as possible. Purchasers of the albumen for use in cake mixes were at one time satisfied with products that would produce cake heights of about 115 mm. However, they are continually demanding products that will create a greater cake height and generally speaking today their demands run for products which will produce cake heights of between about 120 and 125 mm. The greater the height that can be assured by a manufacturer of albumen, the more desirable his product becomes to a producer of prepared cake mixes.

EXAMPLE II

The egg whites of the instant example were fermented with the bacterium *Aerobacter aerogenes*. As before the lipase was added to the liquid egg whites at the outset of the bacterial fermentation. The following table records the results of this treatment:

*Table I*

| Lot | Percent Yolk Prior to Drying | Cake Height |
| --- | --- | --- |
| Control | 0.01 | 125 |
| Control+0.03% added egg yolk | 0.04 | 110 |
| Control+0.03% added egg yolk+0.01% lipase | 0.012 | 126 |
| Control+0.05% added egg yolk | 0.06 | 90 |
| Control+0.05% added egg yolk+0.01% lipase | 0.018 | 124 |

EXAMPLE III

Eight thousand pounds of liquid egg albumen known to have high yolk content (0.05% or more) were split into two four thousand pounds lots. One lot received the normal processing treatment which consisted of the following steps. After the egg whites had reached a temperature of 37° C. they were inoculated with a bacterial culture. After 16 hours at this temperature the sugar content was below 0.1%. The desugared whites were then fluff dried. The second lot received the following treatment. After the egg whites had reached a temperature of 37° C., 0.003% lipase (.12 lb. lipase dispersed in 1 lb. water) was added while stirring. Immediately following this they received the same bacterial inoculum as the first lot. After 8 hours at 37° C. the sugar content of the whites was below 0.1%. This lot was then dried under the same conditions as the first lot. Angel food cakes were baked using the dried albumen obtained from both lots. The normal processed lot produced an angel food cake of 70 mm. which is unsatisfactory. The lot receiving the lipase treatment produced a satisfactory angel food cake of 118 mm.

EXAMPLE IV

The following example was performed to show the effect of lipase concentration on egg whites which had 0.03% yolk added. Six thousand grams of egg whites having very low yolk content were inoculated with a bacterial culture. The inoculated egg whites were split into lots of five thousand and one thousand grams. To the five thousand gram lot 0.03% egg yolk (1.5 grams) was thoroughly mixed. This material was split into five one thousand sub-lots. Four of these sub-lots received various amounts of lipase and one sub-lot received none. The lipase preparation used was steapsin obtained from a commercial source and had a reported assay of 3.5 x USP. The five lots were then incubated at 37° C. for about 18 hours. After the sugar content was less than 0.1% they were dried. Angel food cakes were baked using the resultant dried albumen giving the following results:

| Egg whites plus 0.03% yolk | Angel Food Cake Height in mm. |
|---|---|
| No lipase added | 108 |
| 0.0005% lipase added | 114 |
| 0.0010% lipase added | 123 |
| 0.0025% lipase added | 128 |
| 0.0050% lipase added | 130 |

The remaining one thousand gram lot which had no yolk added was incubated and dried under the same conditions as the first five sub-lots. The angel food cake made with the dried albumen of the above lot was 130 mm. in height. It was noted that the egg whites which had received 0.0025% or 0.005% lipase had a sugar content of less than 0.1% in two hours shorter incubation time than all other samples.

Obviously many modifications and variations of the invention as hereinbefore set forth may be made without departing from the spirit and scope thereof, and therefore only such limitations should be imposed as are indicated in the appended claims.

We claim:

1. A process for reducing the lipid content of egg albumen which comprises subjecting the albumen containing a small amount of yolk to the action of an added lipase preparation free from zymases and proteases to substantially reduce the lipid content.

2. A process for improving the baking properties of egg albumen which comprises subjecting egg whites containing yolk in sufficient amount to substantially impair the baking properties of whites to the action of an added enzyme preparation consisting essentially of lipase and maintaining the treatment under conditions whereby the yolk in the albumen is reduced sufficiently to substantially improve the baking properties of the treated albumen.

3. In a process for the manufacture of dried egg albumen from egg whites contaminated with a small amount of yolk wherein the albumen is desugared with bacterial fermentation effected by bacteria added to the albumen and the desugared whites subsequently dried, the step comprising subjecting the liquid egg albumen prior to drying to the action of an added lipase preparation free from zymases and proteases for a period of time correlated with the concentration and activity of the lipase preparation and with temperature to substantially reduce the lipid content and increase the rate of desugaring.

4. A process for improving the food preparation properties of egg albumen which comprises adding to egg whites containing yolk in an amount sufficient to substantially impair the food preparation properties of the whites about 0.001% to about 0.05%, by weight, of enzyme preparation consisting essentially of lipase, and holding said egg whites with said lipase therein for a period of time at a temperature sufficient to substantially reduce the lipid content.

5. The process as set forth in claim 4 wherein the temperature at which the egg whites and lipase are held is between about 20° C. and 50° C.

6. The process as set forth in claim 4 wherein the pH of the egg white and lipase mixture is between about 5 and about 8.

7. A process of improving the food preparation properties of egg albumen which comprises bacterially fermenting the egg whites by adding bacteria to the egg whites to reduce the sugar content thereof, and carrying out said bacterial fermentation with added enzyme preparation consisting essentially of lipase to reduce the lipid content of the albumen and to speed the bacterial fermentation process.

References Cited in the file of this patent

UNITED STATES PATENTS

| 2,630,387 | Epstein et al. | Mar. 3, 1953 |
| 2,744,017 | Baldwin | May 1, 1956 |

FOREIGN PATENTS

| 124,968 | Great Britain | Apr. 10, 1919 |

OTHER REFERENCES

"Egg Albumen in Food Production," by Grover appearing in Food Manufacture, July 5, 1940; p. 185 relied on.

Chemistry and Technology of Enzymes, 1949 by Tauber, pub. by John Wiley & Sons, Inc. (New York); p. 483 relied on.

"Bacteriology and Mycology of Foods," by Tanner, first ed., John Wiley & Sons, Inc. (New York), pp. 460 and 461.